(12) United States Patent
Nagatomi

(10) Patent No.: US 11,254,201 B2
(45) Date of Patent: Feb. 22, 2022

(54) WORK VEHICLE

(71) Applicant: Kubota Corporation, Osaka (JP)

(72) Inventor: Tatsuya Nagatomi, Sakai (JP)

(73) Assignee: Kubota Corporation, Osaka (JP)

( * ) Notice: Subject to any disclaimer, the term of this patent is extended or adjusted under 35 U.S.C. 154(b) by 86 days.

(21) Appl. No.: 16/896,322

(22) Filed: Jun. 9, 2020

(65) Prior Publication Data

US 2021/0094408 A1 Apr. 1, 2021

(30) Foreign Application Priority Data

Sep. 26, 2019 (JP) .............................. JP2019-175586

(51) Int. Cl.
*B60K 11/04* (2006.01)
*B62D 25/08* (2006.01)

(52) U.S. Cl.
CPC ............ *B60K 11/04* (2013.01); *B62D 25/084* (2013.01)

(58) Field of Classification Search
CPC ............................... B60K 11/04; B62D 25/084
See application file for complete search history.

(56) References Cited

U.S. PATENT DOCUMENTS

| | | | | |
|---|---|---|---|---|
| 2009/0008180 A1* | 1/2009 | Stefanelli | ................. | B62J 17/02 180/229 |
| 2011/0139525 A1* | 6/2011 | Karl | ....................... | B60K 11/08 180/68.1 |
| 2013/0153180 A1* | 6/2013 | Montocchio | ........... | B60K 11/04 165/121 |
| 2014/0291052 A1* | 10/2014 | Kaita | ..................... | B60K 11/08 180/229 |
| 2016/0280059 A1* | 9/2016 | Hagimoto | ................ | B62J 17/02 |
| 2017/0036717 A1* | 2/2017 | Wakabayashi | ......... | B60K 11/06 |
| 2018/0134179 A1* | 5/2018 | Wakabayashi | ........... | B60H 1/16 |

FOREIGN PATENT DOCUMENTS

JP            200967072 A       4/2009

\* cited by examiner

*Primary Examiner* — Bryan A Evans
(74) *Attorney, Agent, or Firm* — The Webb Law Firm

(57) ABSTRACT

A work vehicle of the invention includes: a pair of right and left front wheels disposed in a front part of the vehicle body; a pair of right and left rear wheels disposed in a rear part of the vehicle body; a side wall disposed at an outer end part of one side in a right-left direction of the vehicle body; and a radiator disposed between the front wheels and the rear wheels in a side view and on an inner side relative to the side wall in a plane view, wherein the radiator is disposed with an air-suction surface thereof facing toward the side wall to form an air-suction opening in a bottom part of a space between the air-suction surface and an inner surface of the side wall, and wherein a dust-proof body protruding downward to a lower level than a level of a lower end of the vehicle body is disposed on at least one of: a front side of the air-suction opening and a rear side of the front wheels; and a rear side of the air-suction opening and a front side of the rear wheels.

5 Claims, 4 Drawing Sheets

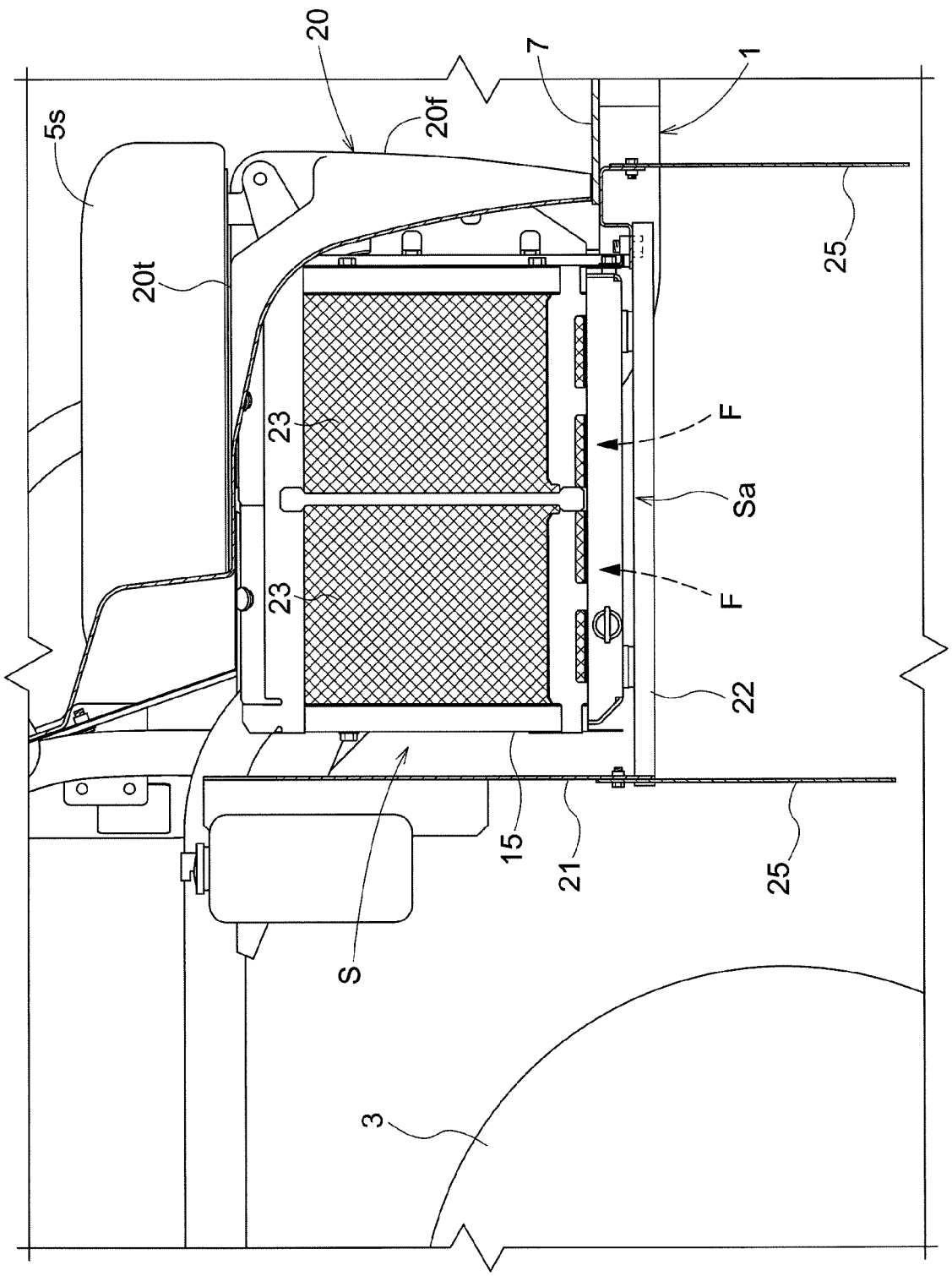

WORK VEHICLE

CROSS-REFERENCE TO RELATED APPLICATION

This application claims priority to Japanese Patent Application No. 2019-175586 filed Sep. 26, 2019, the disclosure of which is hereby incorporated by reference in its entirety.

TECHNICAL FILED

The present invention relates to a work vehicle having an improved dust-proof performance of a radiator disposed in a side part of a vehicle body.

BACKGROUND ART

As a work vehicle having the configuration described above, Patent Literature 1 describes a configuration in which a radiator is disposed in an outer part of a vehicle body below a driver's seat-mounting stage extending in a right-left direction of the vehicle body in a driving part.

In Patent Literature 1, there is disclosed a configuration in which a radiator is disposed on an inner side of a right lateral side surface of the driver's seat-mounting stage and air can be sucked from a lower side of the vehicle body through a predetermined gap formed between an air-suction surface of the radiator and the right lateral side surface of the driver's seat-mounting stage.

CITATION LIST

Patent Literature

[Patent Literature 1] Japanese Patent Application Laid-Open Publication No. 2009-67072

SUMMARY OF INVENTION

Technical Problem

However, with the work vehicle having the radiator disposed between front and rear wheels as described in Patent Literature 1, it can be imagined that, for example, when the work vehicle travels on a farm field, dust including straws and dirt which are stirred up by the front wheels is sucked by the radiator, the dust is attached to the air-suction surface, and cooling performance is decreased.

For the above reason, there has been a demand for a work vehicle in which a radiator hardly sucks dust even when dust on the ground is stirred up by wheels.

Solution to Problem

The feature of the work vehicle according to the invention is to include a vehicle body having an engine; a pair of right and left front wheels disposed in a front part of the vehicle body; a pair of right and left rear wheels disposed in a rear part of the vehicle body; a side wall disposed at an outer end part of one side in a right-left direction of the vehicle body; and a radiator disposed between the front wheels and the rear wheels in a side view and on an inner side relative to the side wall in a plane view, to which radiator cooling water of the engine is supplied, wherein the radiator is disposed with an air-suction surface thereof facing toward the side wall to form an air-suction opening in a bottom part of a space between the air-suction surface and an inner surface of the side wall, and wherein a dust-proof body protruding downward to a lower level than a level of a lower end of the vehicle body is disposed on at least one of: a front side of the air-suction opening and a rear side of the front wheel; and a rear side of the air-suction opening and a front side of the rear wheel.

According to this feature, the air-suction surface of the radiator is supplied with air sucked from the lower side of the vehicle body via the air-suction opening. For example, in the vehicle equipped with the dust-proof body which protrudes to a lower side than the lower end of the vehicle body, and is disposed on the front side of the air-suction opening, the phenomenon in which dust stirred up by the front wheels flows into the air-suction opening when the vehicle body moves forward can be prevented by the dust-proof body. Also, in the vehicle equipped with the dust-proof body which protrudes downward to a lower level than the level of the lower end of the vehicle body and is disposed on the rear side of the air-suction opening, the phenomenon in which dust stirred up by the rear wheels flows into the air-suction opening when the vehicle body moves rearward can be prevented by the dust-proof body on the rear side.

Therefore, it becomes possible to configure the work vehicle in which the radiator hardly sucks dust even when dust on the ground is stirred up by the wheels. In particular, with this configuration, a reduction in costs is realized because it requires a simple arrangement of the members only with the dust-proof bodies.

As an additional feature to the above, the dust-proof body may have a plate shape, and have a plate width along a right-left direction of the vehicle body which may be larger than an opening width of the air-suction opening along a width direction of the vehicle body.

According to this feature, the flow of dust stirred up by the wheels is interrupted by the dust-proof body having the plate shape. For example, even if some dust passes by the outer edge in the width direction of the dust-proof body, the phenomenon in which dust flows to the direction of the air-suction opening is suppressed and the phenomenon in which dust flows into the air-suction opening can be prevented, because the plate width of the dust-proof body is larger than the opening width of the air-suction opening.

As an additional feature to the above, the dust-proof body may be disposed at a position overlapping with the front wheel and the rear wheel when viewed in the front-rear direction of the vehicle body.

According to this feature, for example, the dust-proof body disposed on a front side of the air-suction opening can interrupt dust which has been stirred up by the front wheels and often flows rearward in a linear manner when the vehicle body moves forward. In such a way, the dust-proof bodies are disposed at a position where the most dust flows, and thus sucking of dust can be prevented.

As an additional feature to the above, the dust-proof body may be made of a flexible material.

According to this feature, even if the dust-proof bodies occasionally contact with a protrusion on the ground during travelling, the dust-proof bodies only deform flexibly on contact without being broken, the bodies return to original positions after the contact, and the flow of dust can be suppressed.

As an additional feature to the above, the dust-proof bodies may be disposed on a front side of the air-suction opening and on a rear side of the air-suction opening, and the dust-proof bodies may have the same shape.

According to this feature, since the dust-proof bodies having the same shape can be disposed on the front side of and on the rear side of the air-suction opening, the dust-proof bodies can be used in common, which suppress increases in the number of parts and in cost.

BRIEF DESCRIPTION OF DRAWINGS

FIG. 4 is a cross sectional side view showing a positional relationship between the radiator and the dust-proof fan.

DESCRIPTION OF EMBODIMENTS

Figure 1:
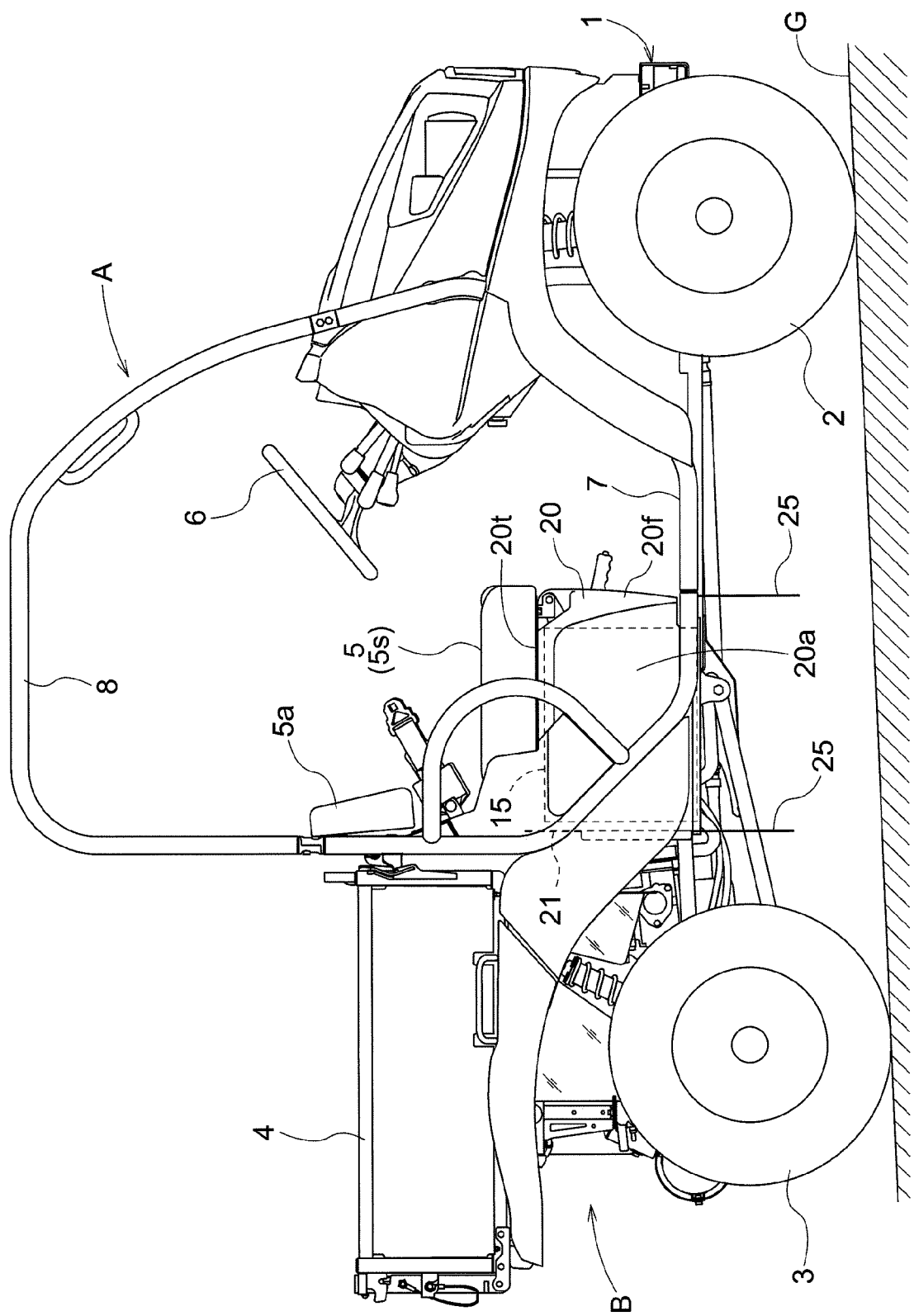
FIG. 1 is a side view of a work vehicle.

Embodiments of the present invention will be described below with reference to the drawings.
[Entire Arrangement]
As shown in FIG. 1, a work vehicle is configured by disposing a pair of right and left front wheels 2 in a front part of a vehicle body 1, a pair of right and left rear wheels 3 in a rear part of the vehicle body 1, a driving part A in a middle part of the vehicle body 1, a loading platform 4 in the rear part of the vehicle body 1, and a motor part B below the loading platform 4.

The work vehicle is configured to be switchable between a two-wheel driving mode transmitting a driving force from the motor part B to the rear wheels 3 and a four-wheel driving mode transmitting a driving force from the motor part B to the front wheels 2 and to the rear wheels 3 by operation of a mode-switching lever, and is configured as a utility vehicle to be used for multipurpose works such as farm work and carrying work. The loading platform 4 is configured to be switched by a manual operation to a slanting posture with a front side being elevated so as to allow a loaded object to be discharged rearward due to its own weight.

The driving part A is equipped with a driver's seat 5 where a driver sits, a steering wheel 6 for steerably operating the front wheels 2 on the front side of the driver's seat 5, and a floor 7 in the lower part thereof. The driving part A is equipped with ROPS frames 8 arranged on right and left sides in order to protect the driver and passengers if the vehicle body 1 overturns.

Figure 3:
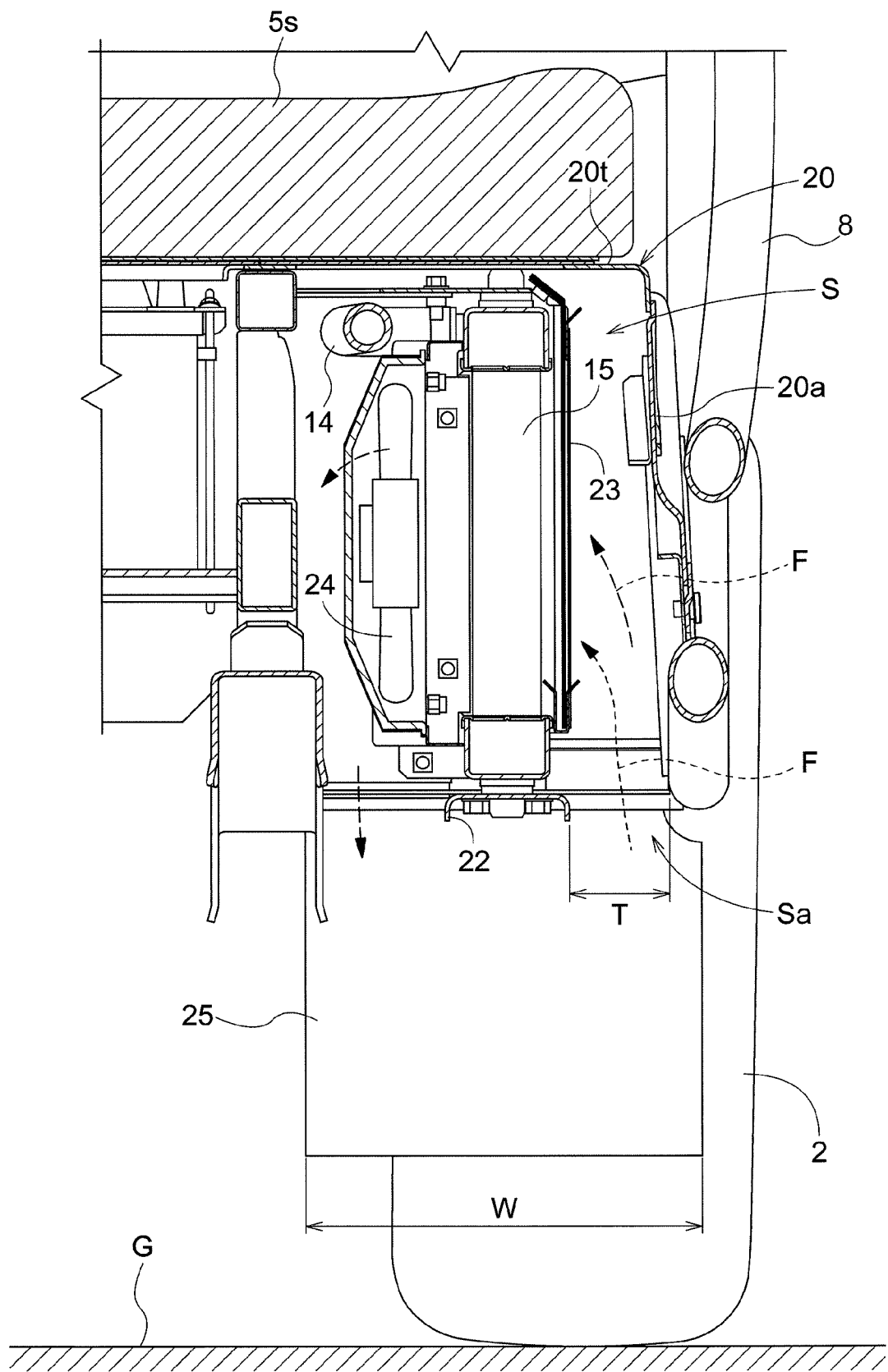
FIG. 3 is a cross sectional rear view showing a positional relationship between a radiator and a dust-proof fan.

The driver's seat 5 is arranged at one side of the right-left direction of the vehicle body, a passenger's seat 5s is arranged adjacently to the driver's seat 5 laterally as shown in FIG. 1, FIG. 3 and FIG. 4 (only partially shown in FIG. 3 and FIG. 4), and a seat back 5a, which is arranged at the rear part of the driver's seat 5 and of the passenger's seat 5s, is disposed over the entire width of the right-left direction of the vehicle body 1.

Figure 2:
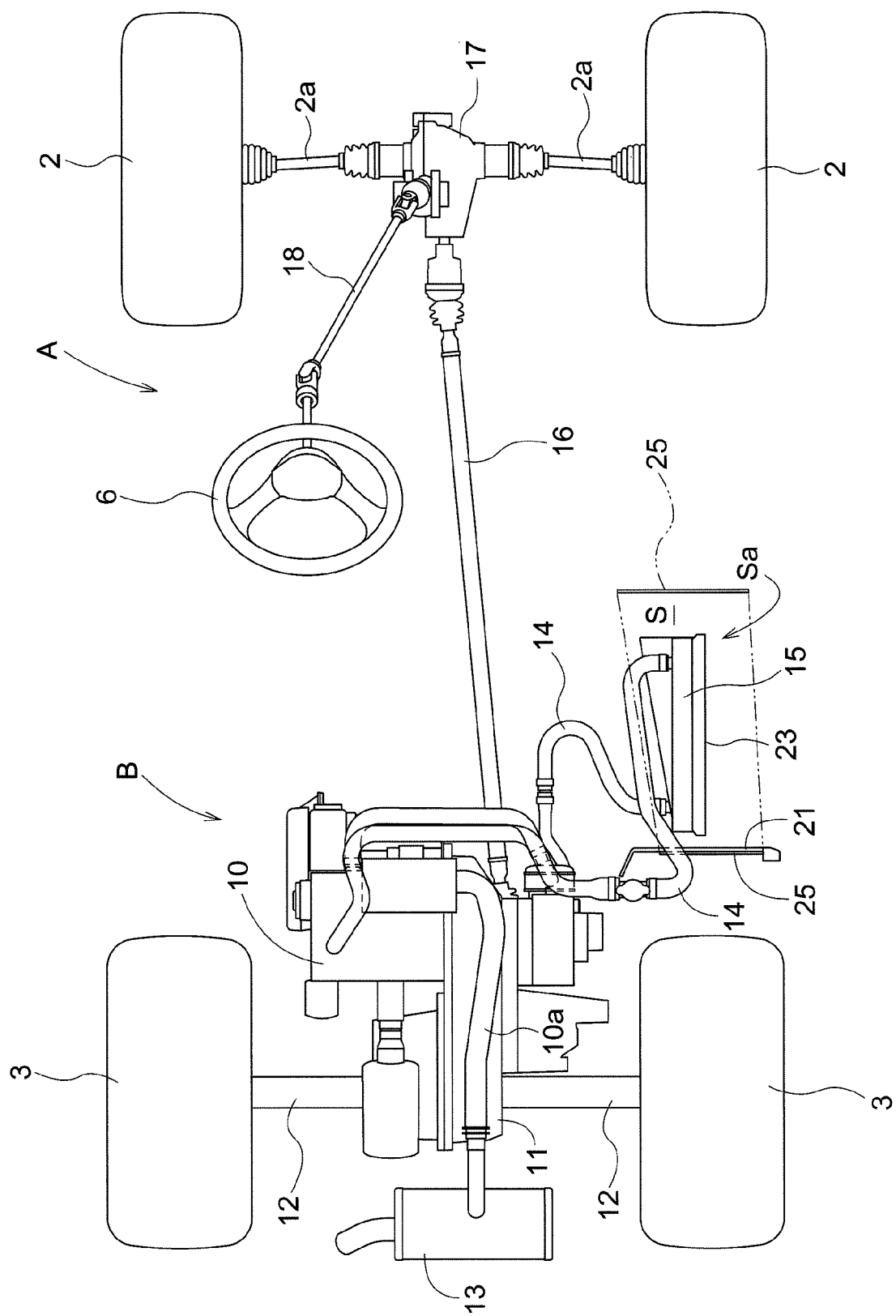
FIG. 2 is a plan view showing a driving structure of the work vehicle.

[Motor Part]
As shown in FIG. 2, the motor part B is provided with an engine 10 and a transmission case 11, and a transmission arrangement which transmits a driving force changed in the transmission case 11 to the right and left rear wheels 3 via a rear shaft (not shown) housed in right and left rear shaft cases 12. Also, the motor part B is provided with an exhaust system which sends an exhaust gas of the engine 10 to a muffler 13 via an exhaust pipe 10a, and a cooling system which supplies cooling water of the engine 10 to the radiator 15 via a cooling-water channel pipe 14. The radiator 15 is disposed between the front wheel 2 and the rear wheel 3, on an inner side relative to a side wall 20a formed at the outer edge of a center cover 20 in the right-left direction of the vehicle body as shown in FIG. 1, FIG. 3 and FIG. 4.

As shown in FIG. 2, the vehicle body 1 is provided with a transmission arrangement which transmits a driving force changed in the transmission case 11 to the front wheels 2 via a propeller shaft 16, a front part differential case 17, and right and left front shafts 2a. Also, the vehicle body 1 is provided with a steering operation mechanism which achieves a steering operation by transmitting a rotating operation force of the steering wheel 6 from a steering shaft 18 to a steering actuation mechanism (not shown) of the front wheels 2.

[Dust-Proof Structure of Radiator]
As shown in FIG. 3 and FIG. 4, the center cover 20 includes an upper wall 20t extending in the right-left direction of the vehicle body in a horizontal posture below the driver's seat 5, and a front wall 20f which stands upward from the level of the floor 7 to be connected to the upper wall 20t. At the right end of the center cover 20, the side wall 20a, which is a vertical wall, is formed to be connected to the upper wall 20t and the front wall 20f without gap.

The driver's seat 5 is supported by the upper face of the upper wall 20t of the center cover 20. A radiator chamber S, which houses the radiator 15 on an inner side of the side wall 20a, is formed in the right end part in the right-left direction of the vehicle body inside the center cover 20.

As shown in FIG. 4, the rear side of the radiator chamber S in the front-rear direction of the vehicle body is adjacent to a wheel housing space for housing the rear wheel 3 on the right side. Because of such a positional relationship, a partition wall 21 in a standing posture is disposed on a rear side of the radiator chamber S, in order to eliminate the inconvenience that dust including straws and dirt from the wheel housing space (hereinafter collectively referred to as "dust and the like") enter the radiator chamber S.

With this, the upper side and the front side of the radiator chamber S are separated from an external space by the upper wall 20t and the front wall 20f of the center cover 20, the right side is separated from the external space by the side wall 20a, and the rear side is separated from the wheel housing space by the partition wall 21. The radiator chamber S is formed as a space opening downward basically, and partially communicates with an adjacent space on the left side of the vehicle body relative to the radiator chamber S in the center cover 20, and with the space in which the engine 10 is disposed.

As shown in FIG. 3 and FIG. 4, in the bottom part of the radiator chamber S, a support frame 22 extending in the front-rear direction at the height which is approximately equal to the height of the floor 7 is disposed, and the radiator 15 is supported in a state of being placed on and attached to the support frame 22. In particular, in the radiator chamber S, the radiator 15 is disposed at the position which is away from the inner surface of the side wall 20a by a set distance, in a posture in which the air-suction surface is oriented toward the side wall 20a. With this, the air-suction opening Sa is formed at the bottom part of the radiator chamber S and on the inner side of the side wall 20a.

In the radiator 15, the air-suction surface is formed on an outer side (right side in FIG. 3) of the vehicle body, a dust-proof net 23 is disposed in a region covering the air-suction surface, and an electric radiator fan 24 is disposed on the opposite side. With this, in the radiator chamber S, the lower end of the space in which the air-suction surface of radiator 15 is disposed serves as the air-suction opening Sa.

Therefore, when the radiator fan 24 is driven, air sucked from the lower side of the vehicle via the air-suction opening Sa flows to the air-suction surface of the radiator 15 as shown by arrows F in FIG. 3. The air which has passed through the radiator 15 is conveyed to the lower side of the radiator fan 24 or to the direction of the engine 10 in the radiator chamber S.

In the work vehicle, since the air supplied to the radiator 15 is supplied to the radiator chamber S from the lower side of the vehicle body 1, dust and the like floating near the ground G are easily sucked. In particular, as shown in FIG. 2 and FIG. 3, the air-suction opening Sa is disposed at a position overlapping with the front wheels 2 and the rear wheels 3 when viewed in the front-rear direction. Therefore, inconveniences are caused that dust and the like on the ground G are stirred up by the front wheels 2 and are sucked into the radiator chamber S via the air-suction opening Sa when the vehicle body 1 moves forward, or that dust and the like on the ground G are stirred up by the rear wheels 3 and are sucked into the radiator chamber S via the air-suction opening Sa when the vehicle body 1 moves rearward.

To eliminate these inconveniences, there are disposed dust-proof bodies 25 each of which has a plate shape and protrudes vertically downward to a lower level than a level of a lower end of the vehicle body 1, one being disposed on the front side of the air-suction opening Sa and on the rear side of the front wheels 2 and another being disposed on the rear side of the air-suction opening Sa and on the front side of the rear wheels 3. That is to say, the dust-proof bodies 25 are disposed at a position where the air-suction opening Sa is overlapping with the front wheels 2 and the rear wheels 3 when viewed in the front-rear direction. For the front and rear dust-proof bodies 25, there are used plate materials made of flexible materials such as rubber material and resin material which can deform flexibly, and by using the same shape for the front and rear dust-proof bodies 25, the parts can be used in common.

Also, as shown in FIG. 3, the front and rear dust-proof bodies 25 are configured to have a relative positional relationship to the air-suction opening Sa in the lateral direction of the vehicle body so that a plate width W in the right-left direction of the vehicle body is sufficiently larger than an opening width T of the air-suction opening Sa in the right-left direction of the vehicle body and the opening width T is included within the region of the plate width W. Further, a predetermined gap is formed between lower edges of the front and rear dust-proof bodies 25 and the ground G.

In particular, the front dust-proof body 25 is disposed to be suspended from the bottom wall of the floor 7 by connecting the upper end thereof to the bottom wall of the floor 7 as shown in FIG. 4. Further, the rear dust-proof body 25 is supported in a suspended manner from the lower end of the partition wall 21 by connecting the upper end thereof to the lower end of the partition wall 21 as shown in FIG. 4.

Effect of Embodiments

As described above, the radiator chamber S is configured so that air is sucked from the lower side of the vehicle body 1 via the air-suction opening Sa. The dust-proof bodies 25 protruding downward to a lower level than the level of the air-suction opening Sa are disposed on the front side and on the rear side of the air-suction opening Sa which is disposed at a position overlapping with the front wheel 2 and the rear wheel 3 when viewed in the front-rear direction of the vehicle body.

Therefore, the inconvenience that dust and the like on the ground G stirred up by the front wheels 2 flow into the air-suction opening Sa when the vehicle body 1 moves forward can be prevented by the front dust-proof body 25, and the inconvenience that dust and the like on the ground G stirred up by the rear wheels 3 flow into the air-suction opening Sa when the vehicle body 1 moves rearward can be prevented by the rear dust-proof body 25. As a result, it is possible to prevent the inconvenience that much dust and the like attach to the dust-proof net 23 on the air-suction surface of the radiator 15, and heat radiation of cooling water is favorably performed. The reduction in the amount of the dust and the like attached to the dust-proof net 23 makes it unnecessary to perform maintenance of the air-suction side of the radiator 15 for a long period.

By setting a relative positional relationship between the dust-proof bodies 25 and the air-suction opening Sa in the lateral direction of the vehicle body so that the plate width W of the dust-proof bodies 25 is sufficiently larger than the opening width T of the air-suction opening Sa and the opening width T is included within the region of the plate width W in the front-rear direction, flow of dust and the like in the direction to the air-suction opening Sa is prevented by the dust-proof bodies 25.

Since the front and rear dust-proof bodies 25 are made of flexible materials, the dust-proof body 25 will not be damaged even if, for example, the dust-proof body 25 contacts with a protrusion on the ground G when the work vehicle goes over the protrusion. Further, since the front and rear dust-proof bodies 25 have the same shape, use of dust-proof body 25 in common can be achieved, the cost can be reduced in comparison with the case where two kinds of dust-proof bodies 25 having different shapes are used.

With this configuration, for example, the inconvenience that dust and the like attached to the rear wheels 3 enter the radiator chamber S is also eliminated, because the radiator chamber S formed inside the center cover 20 is isolated from the space housing the rear wheels 3 by the partition wall 21.

Other Embodiments

The invention may be configured as follows other than the embodiments described above (the same numbers and characters as in the above embodiments are assigned to components having the same feature).

(a) As the dust-proof body 25, other than plate-like body, for example, a block-like body or body having a triangular or non-rectangular sectional shape may be disposed to protrude downward from the vehicle body 1. Also, the dust-proof bodies 25 are desirably composed of flexible materials, and the dust-proof bodies 25 may be composed of reticulate materials which allow air to flow while preventing dust and the like to pass therethrough.

(b) The dust-proof body 25 may be disposed only on the front side of the air-suction opening Sa formed at the bottom part of the radiator chamber S. Since work vehicles run in the forward direction at a relatively high speed, the phenomenon that dust and the like stirred up by the front wheels 2 scatter toward the air-suction opening Sa often occurs. Therefore, even if the dust-proof body 25 is disposed only on the front side of the air-suction opening Sa, the inconvenience that dust and the like are sucked into the radiator chamber S can be suppressed. In a case of a work vehicle performing many works which demand rearward movement of the vehicle body 1, the dust-proof body 25 may be disposed only on the rear side of the air-suction opening Sa.

(c) In the configuration where the dust-proof bodies 25 are disposed on the front side and on the rear side of the air-suction opening Sa, the size of the dust-proof body 25 on the front side and the size of the dust-proof body 25 on the rear side may be made different. For example, in the configuration where the air-suction opening Sa is positioned closer to the front wheels 2 than the rear wheels 3 in the front-rear direction, the probability of dust and the like entering the air-suction opening Sa can be reduced by using the front dust-proof body 25 having a larger size than that of the rear dust-proof body 25. When the sizes of plate-like dust-proof bodies 25 are made different, it is reasonable to make not only the plate widths W of the dust-proof bodies 25 different but also the dimensions in the vertical direction different.

(d) A plurality of the dust-proof bodies 25 may be disposed on the front side of the air-suction opening Sa, or a plurality of the dust-proof bodies 25 may be disposed on the rear side of the air-suction opening Sa. That is to say, in the configuration where two dust-proof bodies 25 are disposed on the front side of the air-suction opening Sa, it becomes possible to reduce the speed of air flow significantly with the dust-proof body 25 at a position near the front wheel 2 and the dust-proof body 25 on the rear side of said dust-proof body 25, and entering of dust and the like in the air-suction opening Sa can be prevented. When a plurality of the dust-proof bodies 25 are to be used to reduce the speed of air flow significantly, the size of the dust-proof bodies 25 may be changed.

INDUSTRIAL APPLICABILITY

The invention can be used for a work vehicle having a radiator in a side part of a vehicle body.

REFERENCE SIGNS LIST

1 Vehicle body
2 Front wheel
3 Rear wheel
10 Engine
15 Radiator
20a Side wall
25 Dust-proof body
Sa Air-suction opening
T Opening width
W Plate width

What is claimed is:

1. A work vehicle comprising:
a vehicle body having an engine;
a pair of right and left front wheels disposed in a front part of the vehicle body;
a pair of right and left rear wheels disposed in a rear part of the vehicle body;
a side wall disposed at an outer end part of one side in a right-left direction of the vehicle body; and
a radiator disposed between the front wheels and the rear wheels in a side view and on an inner side relative to the side wall in a plane view, to which radiator cooling water of the engine is supplied,
wherein the radiator is disposed with an air-suction surface thereof facing toward the side wall to form an air-suction opening in a bottom part of a space between the air-suction surface and an inner surface of the side wall, and
wherein a dust-proof body protruding downward to a lower level than a level of a lower end of the vehicle body is disposed on at least one of: a front side of the air-suction opening and a rear side of the front wheel; and a rear side of the air-suction opening and a front side of the rear wheel.

2. The work vehicle according to claim 1, wherein the dust-proof body has a plate shape, and has a plate width along a right-left direction of the vehicle body which is larger than an opening width of the air-suction opening along a width direction of the vehicle body.

3. The work vehicle according to claim 1, wherein the dust-proof body is disposed at a position overlapping with the front wheel and the rear wheel when viewed in a front-rear direction of the vehicle body.

4. The work vehicle according to claim 1, wherein the dust-proof body is made of a flexible material.

5. The work vehicle according to claim 1, wherein the dust-proof bodies are disposed on a front side of the air-suction opening and on a rear side of the air-suction opening, and the dust-proof bodies have the same shape.

* * * * *